United States Patent Office 3,448,109
Patented June 3, 1969

3,448,109
CERTAIN AMINO-SUBSTITUTED 2-METHYL-3-PHENYL-4(3H)-QUINAZOLINONES
Alex Heusner and Karl Zeile, Ingelheim am Rhein, Germany, assignors to Boehringer Ingelheim G.m.b.H., Ingelheim am Rhein, Germany, a corporation of Germany
No Drawing. Continuation-in-part of applications Ser. No. 391,766, Aug. 24, 1964, and Ser. No. 470,238, July 7, 1965. This application Aug. 1, 1966, Ser. No. 569,040
Int. Cl. C07d 51/42; A61k 27/00
U.S. Cl. 260—256.4                         3 Claims

ABSTRACT OF THE DISCLOSURE

The compounds are 2-methyl-3-aminophenylamino-4(3H)-quinazolinones and acid addition salts thereof, useful as sedatives, tranquilizers and anticonvulsives in warm-blooded animals.

---

This is a continuation-in-part of copending applications Ser. No. 391,766, filed Aug. 24, 1964, and Ser. No. 470,238, filed July 7, 1965, both now abandoned.

This invention relates to novel substitution products of 2-methyl-3-phenyl-4(3H)-quinazolinone and acid addition salts thereof, as well as to various methods of preparing these compounds.

More particularly, the present invention relates to 2-methyl-3-phenyl-4(3H)-quinazolinone substitution products of the formulas

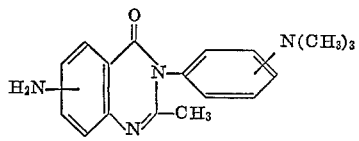

(Ia)

or

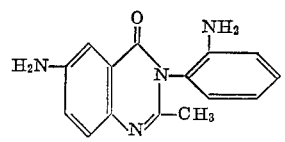

(Ib)

and their non-toxic, pharmacologically acceptable acid addition salts.

The compounds of the Formula I may be prepared by a number of methods involving well known chemical principles, but the following have been found to be particularly convenient and efficient:

METHOD A

By reducing a 2-methyl-3-phenyl-4(3H)-quinazolinone of the formulas

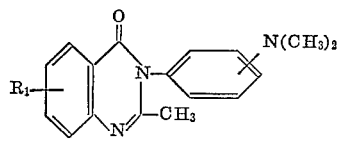

(IIa)

or

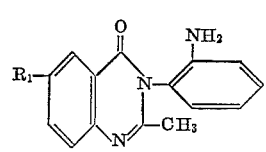

(IIb)

wherein $R_1$ is nitro or nitroso.

The reduction may be effected by means of catalytically activated or nascent hydrogen, for example.

The starting compounds of the Formula IIa or IIb may themselves be prepared by reacting an acetyl anthranilic acid of the formula

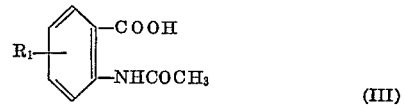

(III)

wherein $R_1$ has the same meanings as in Formulas IIa and IIb, with a phenylenediamine of the formulas

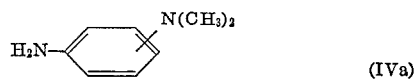

(IVa)

or

(IVb)

in the presence of a dehydrating agent.

METHOD B

By removing the protective group from a compound of the formulas

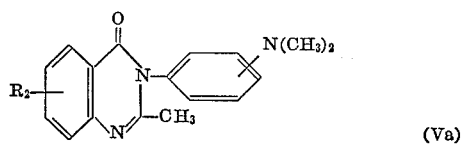

(Va)

or

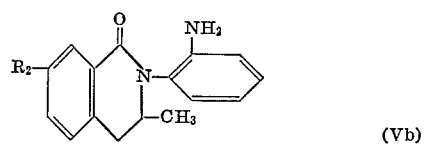

(Vb)

wherein $R_2$ is a reversibly protected amino group.

The removal of the protective group may be accomplished by well known procedures. Examples of suitable protective groups are acyl, carbobenzoxy or benzyl. The acyl protective group may be one of any desired aliphatic, araliphatic or aromatic acid, but it is preferred to start with an acyl-protected compound of the Formula V whose acyl group is particularly easy to split off, such as acetyl. The removal of a carbobenzoxy or benzyl protective group may be accomplished by cleavage with hydrogen.

The starting compounds of the Formula Va or Vb may may themselves be prepared by the process described for the preparation of the starting compounds for Method A, except that substituent $R_1$ in Formula III must be a reversibly protected amino group instead of a nitro or nitroso group.

METHOD C

For the preparation of a compound of the Formula Ib, by reducing a compound of the formula

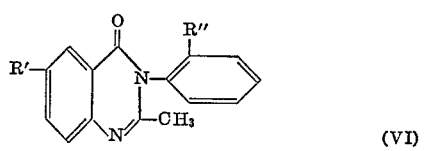

(VI)

wherein R' and R" are nitro or nitroso, with hydrogen. The reduction reaction may be carried out with catalytically activated hydrogen or with nascent hydrogen.

METHOD D

For preparation of a compound of the Formula Ib, by splitting off the protective groups by conveniental methods from a compound of the formula

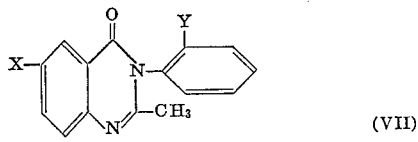

wherein X and Y are reversibly protected amino groups. Examples of suitable protective groups are acyl, benzyloxycarbonyl and benzyl. Among the acyl protective grounds, essentially any aliphatic, araliphatic or aromatic acid acyl group may be used; however, preferred are those acids whose acyl radical may easily be split off by hydrolysis, such as formic acid, acetic acid, propronic acid, p-toluenesulfonic acid and benzoic acid. The hydrolysis may be effected in an acid or alkaline medium. The removal of the benzyloxycarbonyl or benzyl protective group is preferably effected by hydrogenation.

METHOD E

By heating an acetylanthranil of the formula

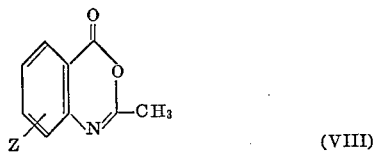

wherein Z is a protected amino group or a nitro or nitroso group, with a phenylenediamine of the Formula IVa or IVb above in the presence or absence of an inert organic solvent, and subsequently, if Z is a protected amino group, removing the protective group by hydrolysis or, if Z is nitro or nitroso, reducing the reaction product with hydrogen as described in Method A.

The dinitro-substituted 2-methyl-3-phenyl-4(3H)-quinazolinones required as starting materials in Method C above may themselves be obtained by customary methods from a nitro-acetylanthranilic acid (or a nitroacetylanthranil) and a nitro-aniline.

The end products of Methods A through E, that is, the compounds of the Formulas Ia and Ib, are bases and may, if desired, be converted into their non-toxic, pharmacologically acceptable acid addition salts by conventional methods; for instance, by dissolving the base in a suitable solvent and acidifying the solution with the desired inorganic or organic acid. Examples of inorganic and organic acids which will form non-toxic, pharmacologically acceptable acid addition salts with a compound of the Formula I include, but are not limited to, hydrochloric acid, hydrobromic acid, phosphoric acid, sulfuric acid, acetic acid, lactic acid, salicylic acid, tartaric acid, methane sulfonic acid, benzoic acid, citric acid, ascorbic acid, propionic acid, and 8-chlorotheophylline.

The following examples further illustrate the present invention and will enable others skilled in the art to understand it more completely. It should be understood, however, that the present invention is not limited to the particular examples given below.

Example 1.—Preparation of 2-methyl-3-(2'-aminophenyl)-6-amino-4(3H)-quinazolinone by Method C 6.52 gm. (0.02) mol) of 2-methyl-3-(2'nitro-phenyl)-6-nitro-4(3H)-quinazolinone were suspended in 150 cc. of diozane, and the suspension was hydrogenated in the presence of Raney nickel at room temperature and atmospheric pressure until no more hydrogen was being absorbed. Thereafter, the catalyst was removed from the reaction solution by filtration, and the filtrate was evaporated to dryness. The residue, raw 2-methyl-3-(2'-aminophenyl)-6-amino-4(3H)-quinazolinone, M.P. 252–254° C., was obtained with a virtually quantitative yield. Recrystallized from aqueous dioxane, the pure product of the formula

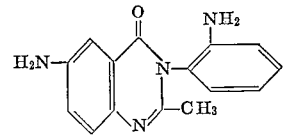

was obtained in the form of colorless crystals which had a melting point of 253–255° C.

The starting material, 2-methyl-3-(2'-nitro-phenyl)-6-nitro-4(3H)-quinazolinone, yellow needles, M.P. 219–221° C., was obtained by reacting 5-nitro-acetylanthranilic acid with o-nitroaniline in the presence of phosphorous oxychloride as a dehydrating agent.

Example 2.—Preparation of 2-methyl-3-(2'-dimethylamino-phenyl)-8-amino-4(3H)-quinazolinone by Method A 114 gm. of 2-methyl-3-(2'dimethylamino-phenyl)-8-nitro-4(3H)-quinazolinone, M.P. 214–216° C., prepared by subjecting 3-nitro-acetylanthranilic acid to a condensation reaction with 1-amino-dimethylaniline in the presence of a dehydrating agent such as phosphorous oxychloride or phosphorus trichloride, were dissolved in 1 liter of dioxane, Raney nickel was added to the solution, and the mixture was hydrogenated at room temperature and 10 atmospheres pressure until the theoretical amount of hydrogen had been absorbed. Thereafter, the catalyst was removed by filtration, and the filtrate was evaporated to dryness in vacuo. A virtually quantitative yield of 2-methyl - 3 - (2' - dimethylamino - phenyl) - 8 - -amino-4(3H)-quinazolinone of the formula

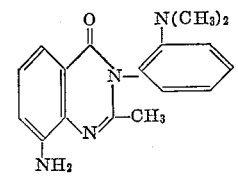

was obtained. Recrystallized from a mixture of chloroform and ligroin, the product was obtained in the form of fine needles having a melting point of 189–190° C.

Example 3

Using a procedure analogous to that described in Example 2, 2-methyl-3-(2'-dimethylamino-phenyl)-7-amino-4(3H)-quinazolinone, M.P. 198–200° C., was prepared from 2 - methyl - 3 - (2' - dimethylamino - phenyl) - 7-nitro-4(3H)-quinazolinone.

Example 4

Using a procedure analogous to that described in Example 2, 2-methyl-3-(3'-dimethylamino-phenyl)-7-amino-4(3H)-quinazolinone.H₂O, M.P. 187–189° C., after recrystallization from water, was prepared from 2-methyl-3 - (3' - dimethylamino - phenyl )- 7 - nitro - 4(3H)-quinazolinone.

Example 5

Using a procedure analogous to that described in Example 2, 2-methyl-3-(2'-dimethylamino-phenyl)-6-amino-4(3H)-quinazolinone, M.P. 153 and 191° C., was prepared from 2-methyl-3-(2'-dimethylamino-phenyl)-6-nitro-4(3H)-quinazolinone.

Example 6

Using a procedure analogous to that described in Example 2, 2-methyl-3-(4'-dimethylamino-phenyl)-6-amino-4(3H)-quinazolinone, M.P. 266–267° C., was prepared from 2 - methyl - 3 - (4' - dimethylamino - phenyl)-6-nitro-4(3H)-quinazolinone.

Example 7

Using a procedure analogous to that described in Example 2, 2-methyl-3-(2'-dimethylamino-phenyl)5-amino-4(3H)-qninazolinone, M.P. 187–189° C. was prepared from 2-methyl-3-(2'-dimethylamino-phenyl)-5-nitro-4(3H)-quinazolinone.

The compounds according to the present invention, that is, the compounds embraced by Formulas Ia and Ib and their non-toxic, pharmacologically acceptable acid addition salts, have useful pharmacodynamic properties. More particularly, they exhibit very pronounced sedative, tranquilizing and anticonvulsive activities, coupled with very low toxicity and complete freedom from CNS stimulating activity, in warm-bloded animals.

For pharmaceutical purposes the compounds of the present invention are administered to warm-blooded animals perorally or parenterally, preferably perorally, as active ingredients in conventional dosage unit compositions, that is, compositions in dosage unit form consisting essentially of an inert pharmaceutical carrier having uniformly distributed therethrough one dosage unit of the active ingredient, such as tablets, coated pills, suspensions, solutions, suppositories and the like. One dosage unit of the compounds according to the present invention is from 20 to 500 mgm., preferably 100 to 150 mgm.

The following example illustrates a dosage unit composition adapted for peroral administration comprising a compound according to the present invention as an active ingredient. The parts are parts by weight.

Example 8.—Tablets

The tablet composition is compounded from the following ingredients:

| | Parts |
|---|---|
| 2-methyl-3-(2'-amino-phenyl)-6-amino-4(3H)-quinazolinone | 100.0 |
| Lactos, pulverized | 130.0 |
| Corn starch | 156.0 |
| Colloidal silicic acid | 8.0 |
| Soluble starch | 4.0 |
| Magnesium stearate | 2.0 |
| Total | 400.0 |

Compounding procedure.—The individual ingredients are thoroughly admixed with each other, and the mixture is pressed into 400 mgm. tablets pursuant to customary tablet-making procedures. Each tablet contains 100 mgm. of the active ingredients and disintegrates in the stomach in about twenty seconds.

Although the above dosage unit composition example illustrates only one of the compounds of the present invention as an active ingredient, it should be understood that any of the other compounds embraced by Formulas Ia and Ib or their non-toxic, pharmacologically acceptable acid addition salts may be substituted as an active ingredient in Example 8. Likewise, the amount of active ingredient may be varied within the dosage unit limits set forth above, and the amounts and nature of the inert components may be varied to meet particular requirements.

While the present invention has been illustrated with the aid of certain specific embodiments thereof, it will be readily apparent to others skilled in the art that the invention is not limited to these embodiments, and that various changes and modifications may be made without departing from the spirit of the invention.

We claim:
1. A compound of the formula

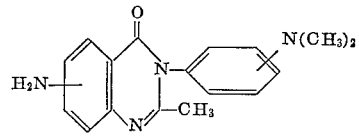

or

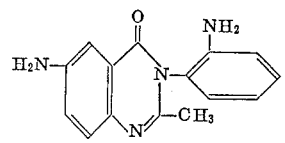

or a non-toxic, pharmacologically acceptable acid addition salt thereof.

2. 2-methyl-3-(2'-dimethylamino-phenyl)-8-amino-4(3H)-quinazolinone.

3. 2-methyl-3-(2'-amino-phenyl)-6-amino-4(3H)-quinazolinone.

References Cited

FOREIGN PATENTS 1,412,615  10/1965  France.

OTHER REFERENCES

Bogert et al.: J. Am. Chem. Soc., vol. 33 (1911), pp. 949–60.

ALEX MAZEL, *Primary Examiner.*

R. J. GALLAGHER, *Assistant Examiner.*

U.S. Cl. X.R.

260—251, 256.5; 424—251

UNITED STATES PATENT OFFICE
CERTIFICATE OF CORRECTION

Patent No. 3,448,109　　　　　　　　　Dated June 3, 1969

Inventor(s) Alex Heusner and Karl Zeile

It is certified that error appears in the above-identified patent and that said Letters Patent are hereby corrected as shown below:

Column 1, line 10, insert --Claims priority, application Germany, September 9, 1963, B 73,447, and application Germany, July 28, 1964, B 77,866.--

Column 2, line 38, formula (Vb) should read

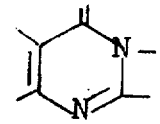

Column 3, line 15, correct "proponic" to read --propionic--.

SIGNED AND SEALED

MAR 10 1970

(SEAL)
Attest:

Edward M. Fletcher, Jr.
Attesting Officer

WILLIAM E. SCHUYLER, JR.
Commissioner of Patents